US010043379B2

(12) United States Patent
Hildmann et al.

(10) Patent No.: US 10,043,379 B2
(45) **Date of Patent: *Aug. 7, 2018**

(54) METHOD FOR VERIFYING AUTHENTICITY OF A MONITORING SIGNAL AND CORRESPONDING MONITORING SYSTEM

(71) Applicant: NEC CORPORATION, Heidelberg (DE)

(72) Inventors: Hanno Hildmann, Madrid (ES); Miquel Martin Lopez, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,603

(22) Filed: Nov. 9, 2017

(65) Prior Publication Data

US 2018/0075732 A1 Mar. 15, 2018

Related U.S. Application Data

(63) Continuation of application No. 15/125,971, filed as application No. PCT/EP2014/055772 on Mar. 21, 2014, now Pat. No. 9,852,612.

(51) Int. Cl.

| | |
|---|---|
| ***G06K 9/00*** | (2006.01) |
| ***G08B 29/04*** | (2006.01) |
| ***G08B 13/196*** | (2006.01) |
| ***G08B 13/16*** | (2006.01) |
| *H04N 5/225* | (2006.01) |

(52) U.S. Cl.

CPC ....... *G08B 29/046* (2013.01); *G08B 13/1672* (2013.01); *G08B 13/196* (2013.01); *G08B 13/19671* (2013.01); *G08B 13/19695* (2013.01)

(58) Field of Classification Search

CPC ............. G06K 9/00; H04N 1/00; G08B 13/00
USPC .................. 382/103, 236; 348/159, 169, 352
See application file for complete search history.

(56) References Cited

U.S. PATENT DOCUMENTS

| | | | | |
|---|---|---|---|---|
| 5,608,377 | A * | 3/1997 | Zhevlev | G08B 29/046 340/429 |
| 9,852,612 | B2 * | 12/2017 | Hildmann | G08B 29/046 |
| 2010/0091108 | A1 | 4/2010 | Kubinski et al. | |
| 2012/0262575 | A1 | 10/2012 | Champagne et al. | |

FOREIGN PATENT DOCUMENTS

| | | |
|---|---|---|
| FR | 2855351 A1 | 11/2004 |

* cited by examiner

*Primary Examiner* — Abolfazl Tabatabai

(74) *Attorney, Agent, or Firm* — Leydig, Voit & Mayer, Ltd.

(57) ABSTRACT

A method for verifying authenticity of a monitoring signal includes employing a multitude of actuators to impact a physical environment with individual signals, wherein the individual signals originate from the actuators and are directed to the physical environment; observing, via at least one sensor device, the physical environment so as to record the monitoring signal, wherein the monitoring signal represents a combined impact of the individual signals on the physical environment; and comparing the monitoring signal with an expected signal to determine a degree of similarity between the monitoring signal and the expected signal, wherein the expected signal is computed on the basis of one or more predetermined template.

20 Claims, 4 Drawing Sheets

METHOD FOR VERIFYING AUTHENTICITY OF A MONITORING SIGNAL AND CORRESPONDING MONITORING SYSTEM

CROSS REFERENCE TO RELATED APPLICATIONS

This application is continuation of U.S. patent application Ser. No. 15/125,971, filed on Sep. 14, 2016, which is a U.S. National Stage Application under 35 U.S.C. § 371 of International Application No. PCT/EP2014/055772, filed on Mar. 21, 2014, both of which applications are hereby incorporated by reference herein. The International Application was published in English on Sep. 24, 2015 as WO2015/139780 A1 under PCT Article 21(2).

FIELD

The present invention relates to a method for verifying authenticity of a monitoring signal and to a corresponding monitoring system being configured to monitor a physical environment.

BACKGROUND

Closed-circuit video surveillance began in 1965 using a TV monitor and a video camera. The development of the videocassette recorder (VCR) allowed for the taping and archiving of video camera data using magnetic tape storage devices. Businesses prone to theft and robbery began using this technology as a deterrent.

In recent years surveillance cameras constitute a sizable part of the security devices industry, and the state of the art cameras are high performance and intelligent cameras using a host of image processing, face recognition and filtering algorithms, etc. A lot of the verification and authentication efforts are focusing on properties of the transmitted images and how to detect whether these images have been tampered with. Other efforts are directed at preventing fake signals from being entered into the system or at ensuring that such activities would not go unnoticed. However, known surveillance systems and methods that shall ensure high tamper-proof are complex and costly.

SUMMARY

In an embodiment, the present invention provides a method for verifying authenticity of a monitoring signal. The method includes employing a multitude of actuators to impact a physical environment with individual signals, wherein the individual signals originate from the actuators and are directed to the physical environment; observing, by at least one sensor device, the physical environment so as to record the monitoring signal, wherein the monitoring signal represents a combined impact of the individual signals on the physical environment; and comparing the monitoring signal with an expected signal so as to determine a degree of similarity between the monitoring signal and the expected signal, wherein the expected signal is computed on the basis of one or more predetermined templates.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
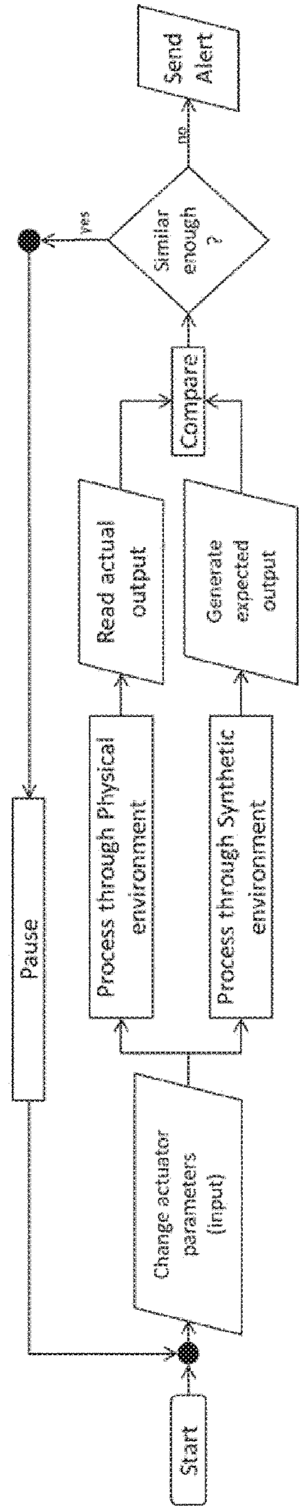
FIG. 1 is a flow diagram illustrating steps of a method according to an embodiment of the present invention.

Embodiments of the present invention provide a method for verifying authenticity of a monitoring signal and a monitoring system in such a way that, by employing certain mechanisms, efficient and effective surveillance of a physical environment can be provided, wherein the method and the monitoring system are made at least substantially tamper-proof.

A method according to an embodiment of the invention is provided for verifying authenticity of a monitoring signal, wherein a multitude of actuators are employed to impact with individual signals on a physical environment, wherein said individual signals originating from said actuators are directed to said physical environment, wherein at least one sensor device observes said physical environment in such a way that said sensor device records the monitoring signal representing a combined impact of said individual signals on said physical environment, wherein said monitoring signal is compared with an expected signal in order to determine a degree of similarity between said monitoring signal and said expected signal, wherein said expected signal is computed on the basis of predetermined templates, wherein said templates are previously generated in a secret initialization procedure in such a way that the impact on said physical environment for each of said individual signals is separately recorded as template by said sensor device.

A monitoring system being configured to monitor a physical environment is provided according to an embodiment of the invention, wherein the system includes a multitude of actuators being configured to impact with individual signals on said physical environment, at least one sensor device being configured to observe said physical environment in such a way that said sensor device records a monitoring signal representing a combined impact of said individual signals on said physical environment and a comparison unit being configured to compare said monitoring signal with an expected signal in order to determine a degree of similarity between said monitoring signal and said expected signal, wherein said expected signal is computed on the basis of predetermined templates, wherein said templates are previously generated in a secret initialization procedure in such a way that the impact on said physical environment for each of said individual signals is separately recorded as template by said sensor device.

According to embodiments of the invention, simple and low cost, but high impact signal verification and authentication methods can be provided by exploiting the interaction between a physical environment under surveillance and a multitude of actuators impacting with individual signals on the physical environment. Specifically, according to an embodiment of the invention, a multitude of actuators are employed to impact on a physical environment, wherein the individual signals that originate from the actuators are directed to the physical environment. According to an embodiment of the invention, at least one sensor device observes the physical environment in such a way that the sensor device records the monitoring signal representing a combined impact of the individual signals on the physical environment through which the individual signals are passed. The monitoring signal recorded by the sensor device is compared with an expected signal in order to determine a degree of similarity between the monitoring signal and the expected signal. The expected signal is generated by computing it on the basis of predetermined individual templates. The templates are previously generated in a secret initialization procedure in such a way that the impact on said physical environment for each of the individual signals is separately recorded as template by the sensor device. To this extent, the known outcome of each activated individual signal can be used to calculate the expected outcome of measurements performed by the sensor device, which includes the aggregation of the activated individual signals. According to an embodiment of the invention, the physical environment is used as mechanism to aggregate individual signals. The individual signals can be combined by the physical environment into a single measurable signal. Consequently, an effective encoding and scrambling of the original individual signals is enabled.

The security of a method or a monitoring system according to an embodiment of the present invention can be based on certain one-way characteristics of the signal processing:

- Generating an expected signal representing a synthetic output without knowing the effects and impacts that individual signals of actuators have on the physical environment, even if their actuator parameters are known, is not possible, because of the complexity of the physical environment.
- Given a monitoring signal, it is not possible to deconstruct the monitoring signal back to the individual impacts that each individual signal has on the physical environment.

Thus, a method and a monitoring system according to certain embodiment of the present invention provide a method for verifying authenticity of a monitoring signal and a corresponding monitoring system that enable an efficient and effective surveillance of a physical environment, wherein the method and the monitoring system are made at least substantially secure against attacks.

An embodiment of the invention could be described as a means to alter the environment that is to be observed in a predictable, but non-replicable manner. This means that any monitoring signal created of this physical environment, e.g. an image, can be compared to an expected outcome, making it virtually impossible to create a fake signal that would not be noticed as such. This is different from either recognizing tampered images or from ensuring secure transmission of the signal between a sensor device, e.g. in the form of a camera, and some verification device.

It is noted that the term of non-replicable can be understood as follows: Without knowing the individual signals that are added to the physical environment according to a method according to the present invention, it is very difficult, to avoid the term impossible, to artificially calculate or predict the expected signal. Without controlled access to the physical environment it is impossible to gather these individual signals and to gauge their impact on the environment. Thus, even with full access to information sent to the actuators creating the individual signals and assuming one has the ability to substitute a fake input to the camera without being detected, it is virtually impossible to predict the monitoring signal expected by the verification method, and thus impossible to add a signal that would be accepted by the verification method.

According to a preferred embodiment the actuators may be controlled by means of one or more configurable actuator parameters in order to generate and provide the individual signals. Thus, the physical environment can be impacted and influenced in a controlled manner.

According to a preferred embodiment the individual signals of the actuators for impacting on the physical environment may be generated on the basis of an input parameter setting. This setting can include the configurable actuator parameters and define the individual signals.

According to a preferred embodiment the input parameter setting may define and/or configure the individual signals that are employed to impact on the physical environment.

According to a preferred embodiment the input parameter setting may define the templates that are employed for computing the expected signal.

According to a preferred embodiment the input parameter setting may be changed over time, preferably at predefined time intervals. Thus, a stream of input parameter settings may be used in order to increase the security and with regard to thwarting attacks.

According to a preferred embodiment, it may be provided that the altering of the input parameter setting is performed in such a way that an input parameter setting to play out is randomly chosen from a predetermined selection of input parameter settings.

According to a preferred embodiment the individual signals generated by the actuators as input signals for the physical environment may include optical signals, audible signals, pressure signals, humidity signals and/or thermal signals. For example light, sound, infrared, ultrasonic sound, or other signals in continuous or discrete, i.e. sampled, form may be used to impact the physical environment effectively.

According to a preferred embodiment the actuators may include light sources, infrared sources, sound sources, ultrasonic sound sources, pressure sources, humidity sources and/or thermal sources.

According to a preferred embodiment, it may be provided that the actuators include light sources, wherein intensity and/or color of the light that is emitted from the individual light sources are controlled via the input parameter setting.

According to a preferred embodiment, it may be provided that the monitoring signal recorded by the sensor device as output signal includes the aggregation of the individual signals passed through the physical environment, in particular in the form of an audio, an image and/or a video signal.

According to a preferred embodiment the sensor device may include a camera, a microphone, a pressure sensor, a humidity sensor and/or a thermal sensor.

According to a preferred embodiment the physical environment may be at least substantially static, i.e. substantially invariant, and/or controlled. Thus, it is ensured that the expected signal can correctly computed based on correct templates. In this context, it is noted that for preferably exact comparison results between the monitoring signal and the expected signal the absence of natural signals, e.g. uncontrolled light through a window, as well as an undisturbed environment are required. If an observed scene or physical environment under observation is not static, a trade-off occurs between the security of the system and allowing for real-time changes in the scene/environment.

According to a preferred embodiment the physical environment may be a room under surveillance.

According to a preferred embodiment the physical environment may include characteristics and/or predefined features, in particular specific materials, textures and/or color surfaces, wherein the characteristics and/or the predefined features reflect and/or refract the individual signals and thereby scrambling the individual signals. For example, the physical environment can be arranged with reflecting objects for scrambling the individual signals.

According to a preferred embodiment, it may be provided that in the case that the physical environment has changed, a recalibration is performed including the secret initialization procedure for updating the templates. Thus, it is ensured that the expected signal can be computed correctly, namely on the basis of the respective templates, because the computation of the expected signal is based on predicting the state of the physical environment based on its physical properties and characteristics.

According to a preferred embodiment, it may be provided that on the basis of the comparison of the monitoring signal and the expected signal the degree of similarity is computed. To this extent, the authenticity of the monitoring signal may be assessed on the basis of the computed degree of similarity.

According to a preferred embodiment the monitoring signal may be assessed as authentic if the computed degree of similarity is within a similarity threshold range. Thus, a threshold range can be defined which allows the conclusion that the monitoring signal is authentic and not faked by an attacker.

According to a preferred embodiment, it may be provided that an alert is triggered if the calculated degree of similarity is outside of a similarity threshold range. Thus, an attack can be indicated.

According to a preferred embodiment, it may be provided that in the case that the monitoring signal is assessed as authentic, a new iteration including the comparison of the monitoring signal and the expected signal with an altered input parameter setting is performed.

According to a preferred embodiment, it may be provided that a predefined time interval is waited until the new/next iteration is started. Thus, it can be regulated how long a number of available parameter settings can be used without reusing already old ones that could already have been seen by an attacker.

As a result, various preferred embodiments of the present invention may provide one or more of the following steps:

- Using a physical environment where multiple signals are read, as scrambler for input information. Changing this input information and later looking for its effects on the output signal allows the system to verify the authenticity of the original signals.
- The information used to guarantee authenticity of the signal, e.g. an image, is embedded before it is read by a sensor, e.g. a camera, thereby thwarting an attack that is able to provide the signal directly to the sensor, e.g. provide the camera lens with a fake image.
- Using the environment as a one way encryption mechanism.
- Using physical signals, e.g. light, sound, etc. or a combination thereof as actuators. Variations like infrared lights or ultrasounds beyond the human perception range may be used in embodiments that require a more inconspicuous installation.

Thus, laws of physics and some physical environment can be used as a mechanism to combine a multitude of physical signals in a manner that is computationally expensive to reverse. Controlled experiments in the environment may enable a recording of the individual impact of individual signals, and will thus allow a reproduction of the combined effect. Given this, the proposed solutions can be used to protect against tampering with e.g. camera signals by anyone who has not access control over the individual signals or has not the means to conduct controlled experiments.

It is noted that a) the absence of natural signals such as light through windows etc. as well as an undisturbed object as characteristic of the physical environment, e.g. without humans walking in front of it, may be required depending on the safety requirements that are to be kept.

FIG. 1 shows a flow diagram illustrating steps of a method according to an embodiment of the present invention. Specifically, the embodiment illustrated in FIG. 1 comprises the following steps in order to assess the authenticity of a monitoring signal:

- By using actuators, a physical environment is impacted and influenced in a controlled manner. The actuator parameters of this actuation constitute the input parameter setting for generating individual physical signals that shall be processed through the physical environment.
- Generating the expected output by synthetically computing the expected signal to receive from the physical environment based on the input parameter setting.
- Comparing the actually received monitoring signal as actual output with the expected signal as expected output, and assessing the monitoring signal's authenticity based on their similarity.
- In case of discrepancy, an alert is sounded.
- In case of similarity, the monitoring signal is accepted as valid and accordingly as authentic. A certain back-off time is waited until a new iteration starts from the beginning.

The method of FIG. 1 represents a method based on the usage of actuators to determine authenticity of a signal, e.g. audio or video, with regard to both the location of the sensor device recording the monitoring signal and the timeliness of the recording and/or measurement.

A method and a monitoring system according to the embodiment of FIG. 1 may cycle through a finite number of discernible variations for the parameters of the actuators. Thus, the process time of one iteration defines how long this can happen before previously used input parameter settings are used and before unused variations have to be run out. The pause illustrated in FIG. 1 enables the arrangement of the length of one iteration.

Figure 2:
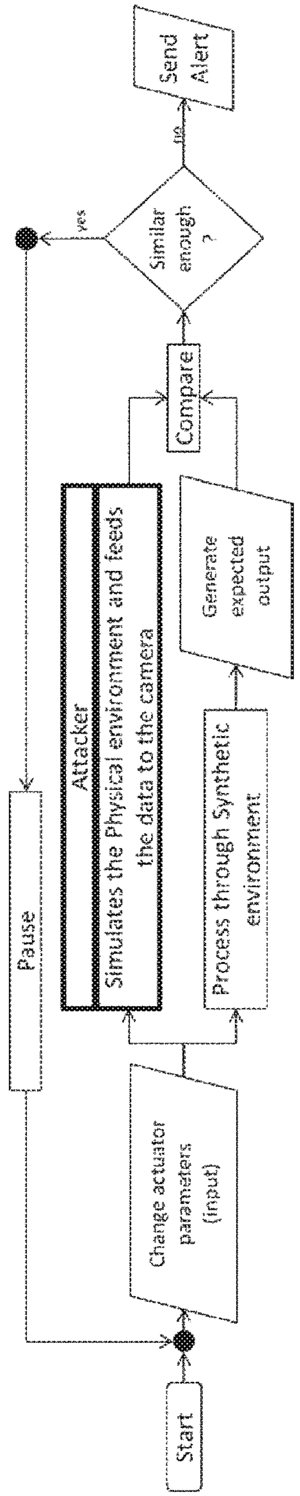
FIG. 2 is a flow diagram illustrating steps of a method according to a further embodiment of the present invention under consideration of an entry point for an attacker.

FIG. 2 shows a flow diagram illustrating steps of a method according to a further embodiment of the present invention in consideration of an entry point for an attacker. The attacker is assumed to have access to a domain that is represented by the upper branch of the parallel part of the flow diagram depicted in FIG. 2. Consequently, an attacker is assumed to be potentially able to a) read or infer the input parameter setting of the actuators as well as to b) insert an altered output, i.e. a faked monitoring signal into the compare unit. Thus, the attacker is trying to produce an input to the comparison unit which will be within the threshold range for similarity. The attacker, however, is not assumed to be able to alter the actuator parameters.

The embodiment of FIG. 2 is described more detailed in the context of an application scenario according to which the authenticity of a video feed is determined in a secure environment such as a bank vault.

According to this scenario, the actuators can be a number of light sources (which are not necessarily visible to the human eye, but to the security camera as sensor device), and the actuator parameters could be the brightness of the light source and/or the color of the light.

The physical environment is the actual room being kept under surveillance, which reflects and refracts the light on different materials, textures and color surfaces, therefore scrambling the original light input, i.e. the individual signals.

The synthetic environment illustrated in FIG. 2 would include a simulated environment where the output, i.e. the expected signal, is created by stacking the individual signals as inputs (e.g. the room with only light source 1 lit with a certain color, plus the room lit with light source 2 at another color, etc.).

The security of the mechanism according to the embodiment of FIG. 2 is based on the one-way characteristics of the processing:

Generating a synthetic output without knowing the effects that individual actuators have on a scene (even if their parameters are known) is not possible, because of the complexity of the physical environment Given an output, it is not possible to deconstruct said output back to the individual effects that each actuator has on the scene Furthermore, it can be assumed that the attacker is able to deduce the input parameter setting, e.g. the target intensity of a light bulb, and that the attacker needs to recreate the scene that the input parameter setting would generate, for every possible combination of individual signals as input to the physical environment.

The number of possible scenes captured in the form of monitoring signals that an attacker would have to reproduce follows the formula $$N_{scenes} = \left( \prod_i N_{states\ of\ param\ i} \right)^{N_{actuators}} \quad (1)$$

For example, if the installation features 10 light bulbs ($n_{actuators}=10$) with $n_1=3$ for three color settings (red, green, blue) and $n_2=3$ for three intensity settings (off, medium, on), this would yield $(3\cdot3)^{10}\approx3.5$ billion combinations, i.e. individual input parameter settings, which, in case that they have to be played out one per second, would take 110 years to complete. In the case that the choice of an input parameter setting to play out is randomly chosen, an attacker would need an even longer time to ensure he has seen a large percentage of the possible combinations.

The complexity of the physical environment determines the degree of difficulty: The formula (1) considers the number of actuators as well as the actuator parameters for each of them. This enables the number of different possible scenes and accordingly possible monitoring signals. The degree to which these are different from each other, and to which extend, depends on the physical environment, e.g. the room under surveillance. Thus the computational cost is related to the environment as well.

Given the limited access to the environment under surveillance, the computational complexity of an attack, and the need to successfully and timely solve the challenges of a stream of inputs over time, the embodiment of FIG. 2 provides for an additional defense against attacks based on faking the input signal.

It is noted that there may be a trade-off between security and false positives: A scene will be deemed authentic if it falls within a similarity threshold range of the synthetic computed output. Due to small variations in the physical environment, this threshold ranges will have to be adjusted: bigger threshold ranges will increase the precision, i.e. minimize false positives, while smaller thresholds ranges will increase the recall, i.e. all the possible alarms will be caught, but some of them will not be actual alarms.

The embodiment of FIG. 2 can include a surveillance video feed as monitoring signal from a controlled and static physical environment like e.g. a bank vault, where a number of light sources can be controlled with regard to their intensity or color. A number of templates are then generated by recording the impact that the individual light sources at a number of intensities and colors have on a video signal. The combined impact on the physical environment, i.e. the video stream, can then be synthetically calculated from the sum of respective templates; this enables the verification of a signal through the means of comparison between the received signal, i.e. the monitoring signal, and the calculated one, i.e. the expected signal. This means that the monitoring signal and the expected signal based on the respective templates can be used to determine whether the room under surveillance has changed, i.e. whether someone has entered the room or someone has replaced the monitoring signal.

The deduction of the individual templates from the monitoring signal representing an aggregated signal is computationally very costly. Therefore, even if an attacker has both access to the instructions sent to the light sources as well as the means to insert a fake signal to replace the original one, it would not be possible to calculate the required image because the individual templates are required to do so.

Furthermore, a multitude of audio actuators can be used to generate individual audio signals which will be received by sensors as one aggregated signal, i.e. the monitoring signal. By recording the impact of the individual actuators separately in the context of a secret initialization procedure provides the means in the form of templates to calculate the result of their combination; while the calculation of the individual audio signals from an aggregated signal is computationally very costly, if possible at all.

Figure 3:
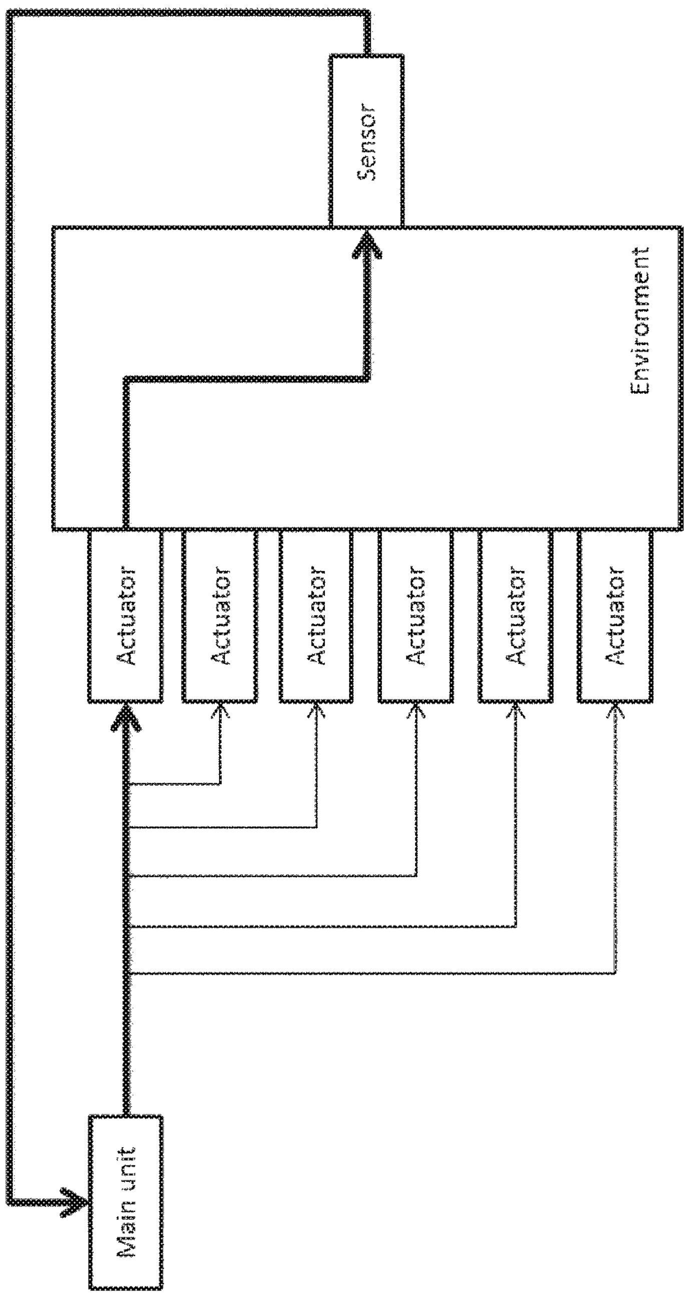
FIG. 3 is a flow diagram illustrating an initialization procedure of a method according to an embodiment of the present invention.

FIG. 3 shows a flow diagram illustrating an initialization procedure of a method according to an embodiment of the present invention. For collecting the information on the resulting sensor signals, i.e. the recording of the individual templates, only one actuator is used in each case. Specifically, FIG. 3 shows the setting up of the mechanism, which requires the recording of signals received by the sensor for each actuator individually, and for all used settings, in the case of using lights and video surveillance, this is all lights are turned on individually with all other lights being off, and all brightness settings are used and recorded.

Figure 4:
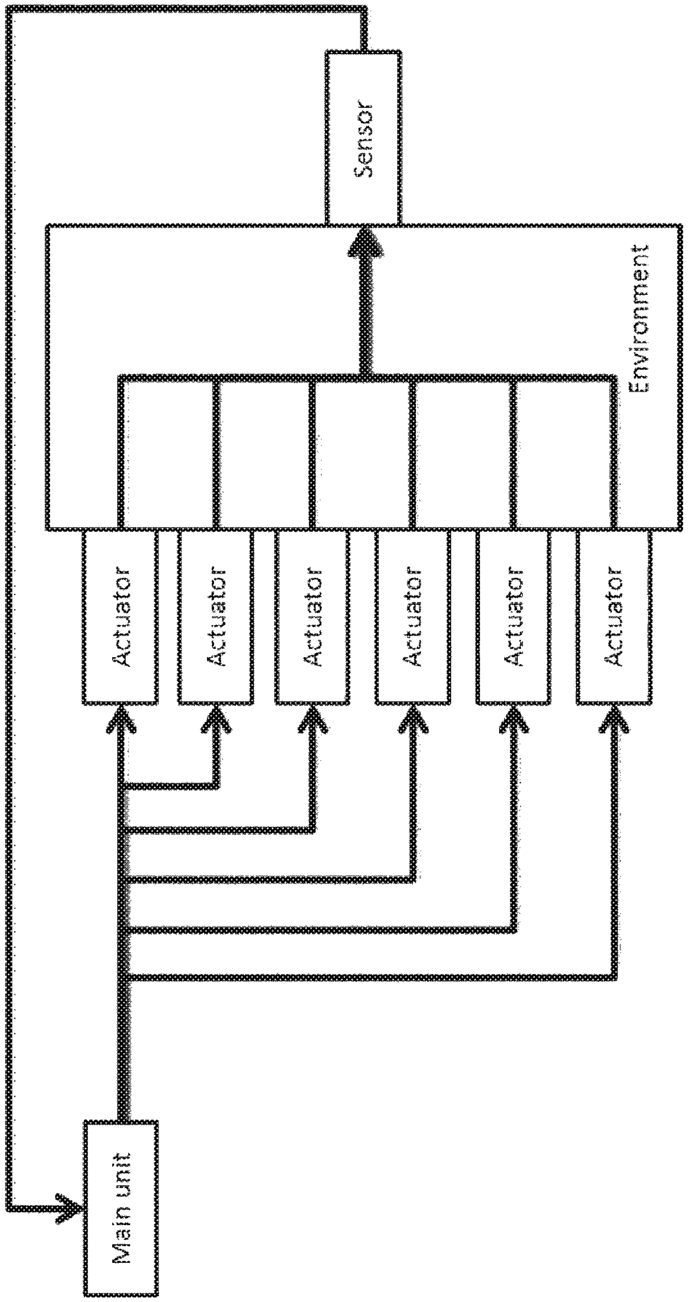
FIG. 4 is a flow diagram illustrating an overview of the recording of a monitoring signal according to an embodiment of the present invention.

FIG. 4 shows a flow diagram illustrating an overview of the recording of a monitoring signal according to an embodiment of the present invention. FIG. 4 shows the aggregated input received by the sensor. The physical environment is used as mechanism to aggregate the individual signals originating from the actuators. The outcome is easily recorded, but the individual outcomes cannot be deduced and the aggregation cannot be avoided since it is the environment that does it. I.e. anything short of shutting the individual actors off to achieve the same situation as depicted in FIG. 4 will not give an attacker the individual templates. Consequently, the environment is acting as both the mechanism combining the individual signals as well as the object that is being observed by the sensor.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for verifying authenticity of a monitoring signal recorded by at least one sensor, the method comprising:
- generating, by a plurality of actuators, a plurality of individual physical signals;
- directing, from the plurality of actuators and into a physical environment, the plurality of individual physical signals generated by the plurality of actuators;
- reading, from the physical environment by the at least one sensor, the combined impact of the plurality of individual physical signals so as to record the monitoring signal;
- computing, based on one or more predetermined templates, an expected signal; and
- comparing, by a comparator, the monitoring signal recorded by the at least one sensor and the expected signal computed based on the one or more predetermined templates so as to determine a degree of similarity between the monitoring signal and the expected signal.

2. The method according to claim 1, wherein the actuators are controlled by one or more configurable actuator parameters.

3. The method according to claim 1, wherein the individual signals of the actuators are generated on the basis of an input parameter setting.

4. The method according to claim 3, wherein the input parameter setting defines the individual signals.

5. The method according to claim 3, wherein the input parameter setting defines the templates for computing the expected signal.

6. The method according to claim 3, wherein the input parameter setting is altered over time.

7. The method according to claim 6, wherein altering of the input parameter setting is performed in such a way that the input parameter setting is randomly chosen from a predetermined selection of input parameter settings.

8. The method according to claim 3, wherein said actuators are light sources, and wherein at least one of intensity or color of the light that is emitted from the individual light sources is controlled via the input parameter setting.

9. The method according to claim 1, wherein the individual signals generated by the actuators include at least one of optical signals, audible signals, pressure signals, humidity signals, or thermal signals.

10. The method according to claim 1, wherein the actuators include at least one of light sources, infrared sources, sound sources, ultrasonic sound sources, pressure sources, humidity sources or thermal sources.

11. The method according to claim 1, wherein the monitoring signal recorded by the sensor includes an aggregation of the individual signals passed through the physical environment in the form of at least one of an audio signal, an image signal, or a video signal.

12. The method according to claim 1, wherein the sensor includes at least one of a camera, a microphone, a pressure sensor, a humidity sensor, or a thermal sensor.

13. The method according to claim 1, wherein the physical environment is at least one of at least substantially static or controlled.

14. The method according to claim 1, wherein the physical environment includes at least one of characteristics or predefined features including at least one of specific materials, textures, or color surfaces, wherein the at least one of characteristics or predefined features at least one of reflect or refract the individual signals and thereby scramble the individual signals.

15. The method according to claim 1, wherein on the basis of the comparison of said monitoring signal and the expected signal a degree of similarity is computed, and wherein the authenticity of the monitoring signal is assessed on the basis of the computed degree of similarity.

16. The method according to claim 1, wherein the monitoring signal is assessed as authentic if the degree of similarity is within a predetermined similarity threshold range.

17. The method according to claim 1, wherein an alert is triggered if the calculated degree of similarity is outside of a predetermined similarity threshold range.

18. The method according to claim 1, wherein in the case that the monitoring signal is assessed as authentic, a new iteration including the comparison of the monitoring signal and the expected signal with an altered input parameter setting is performed.

19. The method according to claim 18, wherein a predefined time interval is waited until the new iteration is started.

20. A monitoring system configured to monitor a physical environment, the system comprising:
- a plurality of individual actuators configured to generate a plurality of individual physical signals and direct the plurality of individual physical signals into the physical environment;
- at least one sensor configured to read, from the physical environment, a combined impact of the plurality of individual physical signals on the physical environment so as to record a monitoring signal;
- a computer configured to compute, based on one or more predetermined templates, an expected signal; and
- a comparator configured to compare the monitoring signal recorded by the at least one sensor and the expected signal computed based on the one or more predetermined templates in order to determine a degree of similarity between the monitoring signal and the expected signal.

* * * * *